United States Patent [19]
Hamaguchi et al.

[11] Patent Number: 5,530,605
[45] Date of Patent: Jun. 25, 1996

[54] MAGNETIC-HEAD SLIDER SUPPORT MECHANISM AND MAGNETIC RECORDING APPARATUS

[75] Inventors: Tetsuya Hamaguchi; Yukio Katou, both of Ibaraki-ken; Masaaki Matsumoto, Odawara; Masaru Matsushima, Kokubunji, all of Japan

[73] Assignee: Hitachi, Ltd., Tokyo, Japan

[21] Appl. No.: 255,756

[22] Filed: Jun. 7, 1994

[30] Foreign Application Priority Data

Jun. 10, 1993 [JP] Japan ................................ 5-138750

[51] Int. Cl.⁶ .............................. G11B 5/48; G11B 21/16
[52] U.S. Cl. ............................................................. 360/104
[58] Field of Search ................................ 360/104, 103, 360/102, 105, 109

[56] References Cited

U.S. PATENT DOCUMENTS

| | | | |
|---|---|---|---|
| 4,245,267 | 1/1981 | Herman | 360/104 |
| 4,740,854 | 4/1988 | Shibuya et al. | 360/104 |
| 5,115,363 | 5/1992 | Khan et al. | 360/104 |
| 5,187,625 | 2/1993 | Blaeser et al. | 360/104 |
| 5,241,437 | 8/1993 | Morimoto et al. | 360/104 |

FOREIGN PATENT DOCUMENTS

62-46474  2/1987  Japan ................................ 360/104

Primary Examiner—John H. Wolff
Assistant Examiner—William R. Korzuch
Attorney, Agent, or Firm—Antonelli, Terry, Stout & Kraus

[57] ABSTRACT

A slider support mechanism of a leaf-spring type movable only in a direction perpendicular to a surface of a disk and having a torsional rigidity equal to or more than 100 gfmm/rad and a spring constant within a range of 0.01–0.5 mg/μm acts a load of 20–100 mg on a magnetic head slider to permit the slider to run in a liquid flying or contact condition. The load equal to or less than 100 mg is stably loaded on the magnetic head slider. Further, the magnetic head slider is not substantially rotated with respect to the magnetic disk surface. Accordingly, a slider running system of a liquid flying type or a solid contact type having a flying amount of 10–40 nm is made possible. Thus, the magnetic disk apparatus of high-density recording and high reliability is provided.

14 Claims, 5 Drawing Sheets

MAGNETIC-HEAD SLIDER SUPPORT MECHANISM AND MAGNETIC RECORDING APPARATUS

BACKGROUND OF THE INVENTION

1. Field of the Invention

The present invention relates to magnetic disk apparatuses which are used as external recording units for computers and the like and, more particularly, to a magnetic-head slider support mechanism for pressing or urging a magnetic head slider, with a minute force, in a direction toward a surface of a magnetic disk, and a magnetic recording apparatus into which the magnetic-head slider support mechanism is incorporated.

2. Related Art And Prior Art Statement

As disclosed in Japanese Patent Unexamined Publication No. 55-22296, a usual or conventional magnetic head slider is supported by a support mechanism which is arranged such that an arm having a length of about 15 to 25 mm and a mechanism element which is called a pivot and a gimbal, which has a torsional rigidity of about 20 gfmm/rad and which is substantially rotatable are joined to each other at a forward end of the arm, and is so arranged as to fly in air above a magnetic disk.

Further, as disclosed in Japanese Patent Unexamined Publication No. 62-99967, a visco-elastic membrane or film in the form of a diaphragm is utilized to support a slider under a rotatable state.

By the way, in recent years, development of a magnetic head slider which runs under a state in which the magnetic head slider is in contact with a surface of the magnetic disk or fly in liquid, in order to reduce a spacing between a magnetic head and the magnetic disk to achieve high recording density has been desired.

Figure 7:
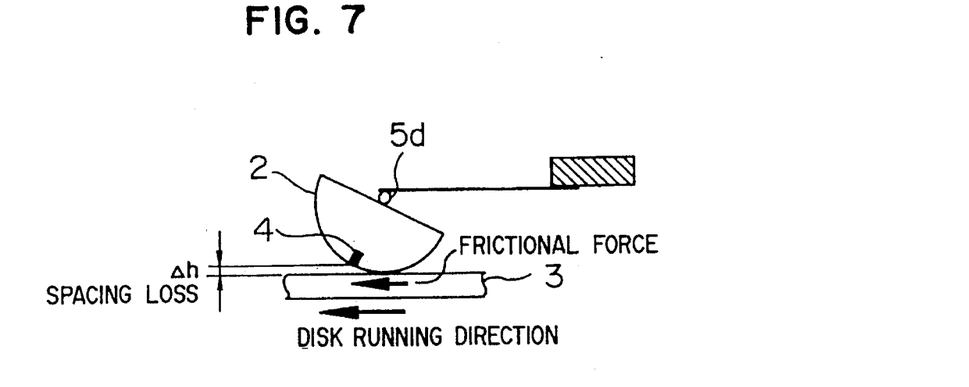
FIG. 7 is a view illustrating a problem to be solved by the invention.

FIG. 7 of the attached drawings schematically shows a state where a curved-surface slider of a contact running type is loaded or mounted on the above-described conventional or prior art support mechanism which has a rotary mechanism at the forward end of the arm. A magnetic head slider 2 is arranged such that a recording and reproducing element 4 most approaches a disk surface under a state or condition in which a magnetic disk 3 is stationary. In the case, however, where the magnetic head slider 2 is subjected to a frictional force by rotation of the disk or by seek operation of the magnetic head slider, the magnetic head slider 2 is rotated to result in a spacing loss Δh for the reason that the magnetic head slider 2 has a rotary mechanism 5d whose torsional rigidity is about 20 gfmm/rad. In the case where the radius of curvature of the slider curved surface is 1 mm, the height of the slider is 0.5 mm and the frictional force is 0.3 gf, Δh amounts to about 30 nm, so that recording and reproducing operation is made impossible. Moreover, the running speeds are varied in inner and outer peripheries of the disk. Furthermore, since presence and absence of the seek operation, the speeds and the accelerations vary as the case may be, Δh is not constant so that steady recording and reproducing cannot be problematically effected.

Figure 8:
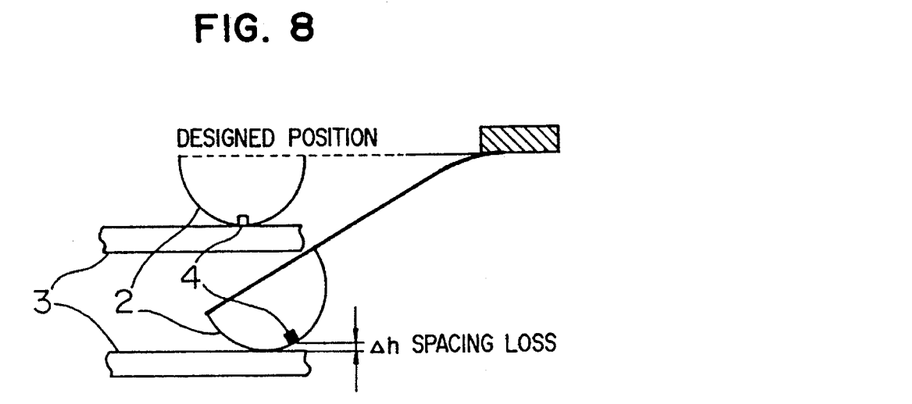
FIG. 8 is a view illustrating a problem to be solved by the invention.

Furthermore, FIG. 8 is a schematic view in the case where the rotary mechanism is provisionally removed in the above-described prior art. Also, in this case, the magnetic head slider 2 is arranged such that the recording and reproducing element 4 most approaches the disk surface under a state where the magnetic disk 3 is stationary (a designed position in FIG. 8). However, owing to the upward and downward movements (fluctuation) of the disk surface produced during rotation of the disk, a spacing loss Δh is generated between the recording and reproducing element 4 and the disk surface, as shown in FIG. 8 in the case where the disk surface is moved, for example, downwardly. For this reason, there is a problem that recording and reproducing at high recording density cannot be practiced stably.

In this manner, when the curved-surface slider of a contact running type is loaded on the prior art support mechanism having the rotary mechanism at the forward end of the arm, the magnetic head slider is rotated relative to the guide arm by the frictional force and the fluctuation of the disk surface. Thus, the recording and reproducing element is spaced away from the magnetic disk surface.

Further, the prior art which utilizes a visco-elastic film in the form of a diaphragm has also a torsional rigidity of the same level of that of the prior art which has the rotary mechanism, and is so designed as to be substantially rotatable with respect to the magnetic disk. Accordingly, even if the curved-surface slider is loaded on the prior art, a similar problem is generated.

Moreover, according to these prior arts, a spring constant of the support mechanism in a direction, in which the magnetic head slider is urged against the magnetic disk surface is about 1–2 mg/μm. Normally, the magnetic disk surface is moved upwardly and downwardly (fluctuation) 10 μm by the rotation of the magnetic disk. Accordingly, variation of the urging force becomes 20 mg. In the case where a full or total load is equal to or lower than 100 mg or so, a ratio of variation becomes equal to or higher than 20%. Thus, the stable head running is impossible.

Meanwhile, in order to reduce the spring constant in the urging direction in the aforesaid prior art, it is required in the case of Japanese Patent Unexamined Publication No. 55-22296 to increase a length of the support mechanism 10. In this case, the torsional rigidity is further reduced, and the rigidity in the other direction is reduced, so that a bad influence is exerted also upon the seek operation of the magnetic head slider, that is, upon the time of operation of movement in a radial direction of the disk. This is not preferable. In the case where the visco-elastic film in the form of the diaphragm is utilized, it is required to reduce the thickness of the visco-elastic film, or to enlarge the diameter thereof, in order to reduce the spring constant in the urging direction. However, also in that case, an influence of the tension force acting within the surface of the visco-elastic film acts largely. Accordingly, it is extremely difficult to reduce the spring constant.

Furthermore, the support mechanism having a rotary mechanism at the forward end of the arm as shown in FIG. 7 is used in such a manner that the arm which generates a load and the gimbal supporting the slider under a rotatable state are joined to each other by welding and the like. This is not preferable in view of assembling easiness, assembling accuracy, cost and the like.

SUMMARY OF THE INVENTION

A first object of the invention is to provide a magnetic-head slider support mechanism in which variation of a load and rotation or oscillation of a magnetic head slider are not substantially generated by surface fluctuation of a disk, initial assembling errors thereof, a frictional force due to contact between the magnetic head slider and the magnetic disk, seek operation of the magnetic head slider, or the like.

A second object of the invention is to provide a high-density magnetic disk apparatus which is low in cost and which is capable of realizing a magnetic-head slider support running system which is high in reliability, even if a spacing between a head and a disk is several ten nm.

The aforesaid first object of the invention is achieved by the use of a magnetic-head slider support mechanism of a spring type in which a mechanism such as a gimbal, a pivot and the like adapted to make a magnetic head slider freely rotatable is not provided, a torsional rigidity of rotary motion of a magnetic head slider with respect to a guide arm is equal to or larger than 100 gfmm/rad, and the magnetic head slider is substantially movable only in an urging direction, that is, in a direction perpendicular to the disk surface, and further, by the use of the magnetic-head slider support mechanism in which a spring constant in a direction, in which the magnetic head slider is urged against the magnetic disk surface, is equal to or larger than 0.01 mg/μm and equal to or less than 0.5 mg/μm.

Moreover, the aforementioned second object of the invention is achieved by an arrangement in which such magnetic-head slider support mechanism of a spring type is incorporated to form a magnetic disk apparatus of a fluid flying running system or a contact running system.

Here, it is further desirable, if a load, at which the magnetic head slider is urged against the magnetic disk surface, is equal to or more than 20 mg and equal to or less than 100 mg. Further, a system is desirable in which at least a protective film layer or a liquid lubricant layer is provided on a surface of a magnetic disk, and information is recorded and reproduced while the magnetic head slider is in contact with the protective film or the liquid lubricant.

Moreover, any joint is removed from the support mechanism, and the whole is formed by integral molding, whereby it is possible to improve accuracy and reliability, and achieve reduction of manufacturing cost.

In the present support mechanism, a conventional rotary mechanism is dispensed with, and one or more direction changing portions and bent portions are provided, and the present support mechanism is supported at both ends thereof or at two or more than portions by direction changing portions with a curvature such as a spiral unlike a cantilever construction. With such arrangement, the object of the present invention can be effectively and practically attained.

The support mechanism adopts an arrangement in which a rotary mechanism like that of the prior art is dispensed with, and at least one direction changing portions and bent portions are provided on the support mechanism, or flexible beams having a spiral shape which is changed in direction with a curvature, whereby it is possible to reduce the overall length of the support mechanism, which is advantageous for the seek operation, and it is possible to reduce a spring constant in an urging direction. Thus, a load equal to or less than 100 mg can also stably be loaded. For example, in the case where an arrangement in which N direction changing portions are provided on the flexible beam is adopted, an effective length of a spring can be made about (N+1) times, at the maximum, a length L in FIG. 1A. Accordingly, the number of the direction changing portions is changed whereby it is possible to produce any spring constants.

Moreover, since any rotary mechanism such as a pivot and the like is dispensed with, and there are direction changing portions and bent portions or since there are provided direction changing portions like a spiral with a curvature, the slider will not rotate relative to a guide arm in the case where the slider is moved upwardly and downwardly, and a torsional rigidity can also be designed to a value equal to or more than 100 gfmm/rad. Accordingly, even in the case where a frictional force acts upon the slider, the slider is not substantially rotated with respect to the guide arm.

When a torsional rigidity has a value equal to or more than 100 gfmm/rad, a spacing loss Δh can be reduced to about 1 nm where the radius of curvature of the curved surface is 1 mm, the height of the slider is 0.5 mm, and the frictional force is 0.3 gf. For this reason, slider running of a flying type or contact type which is minute in a spacing loss and is steady, and recording and reproducing of high density are made possible.

Furthermore, in the prior art, a load generating portion and a slider support are joined to each other by spot welding and the like. However, the load generating portion and the slider support are manufactured by integral molding in the invention, whereby assembling accuracy can be improved, and the number of parts can be reduced. Thus, manufacturing advantages are also great.

DETAILED DESCRIPTION OF THE PREFERRED EMBODIMENTS

Figure 9:
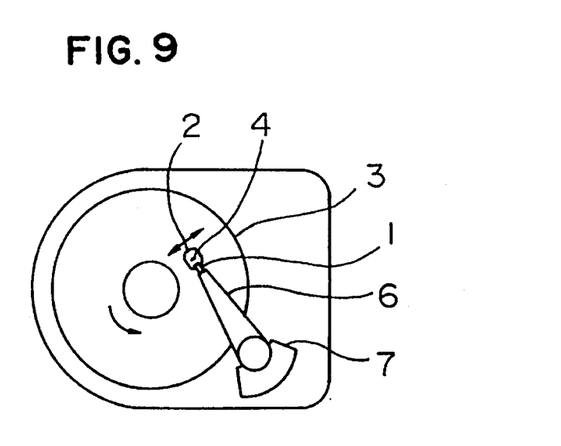
FIG. 9 is a top plan view showing an arrangement of a magnetic disk apparatus.

FIG. 9 is a top plan view showing a basic or fundamental arrangement of a magnetic disk apparatus to which the invention is applied. A magnetic-head slider support mechanism 1 is supported by a guide arm 6, and is capable of being moved substantially in a radial direction on a surface of a rotating magnetic disk 3, by a voice coil motor 7. The magnetic-head slider support mechanism 1 is arranged as illustrated in a subsequently described embodiment. A magnetic head slider 2 having mounted thereon a recording and reproducing element 4 having self-recording and self-reproducing functions, or function of recording due to an induction mold and function of reproduction due to magnetic resistant effects is mounted on an end or on a center of the magnetic-head slider support mechanism 1. Thus, it is possible for the magnetic-head slider support mechanism 1 to move the recording and reproducing element 4 to any locations on the magnetic disk at high speeds to record and reproduce information.

Various embodiments of the invention will hereunder be described.

Figures 1A, 1B:
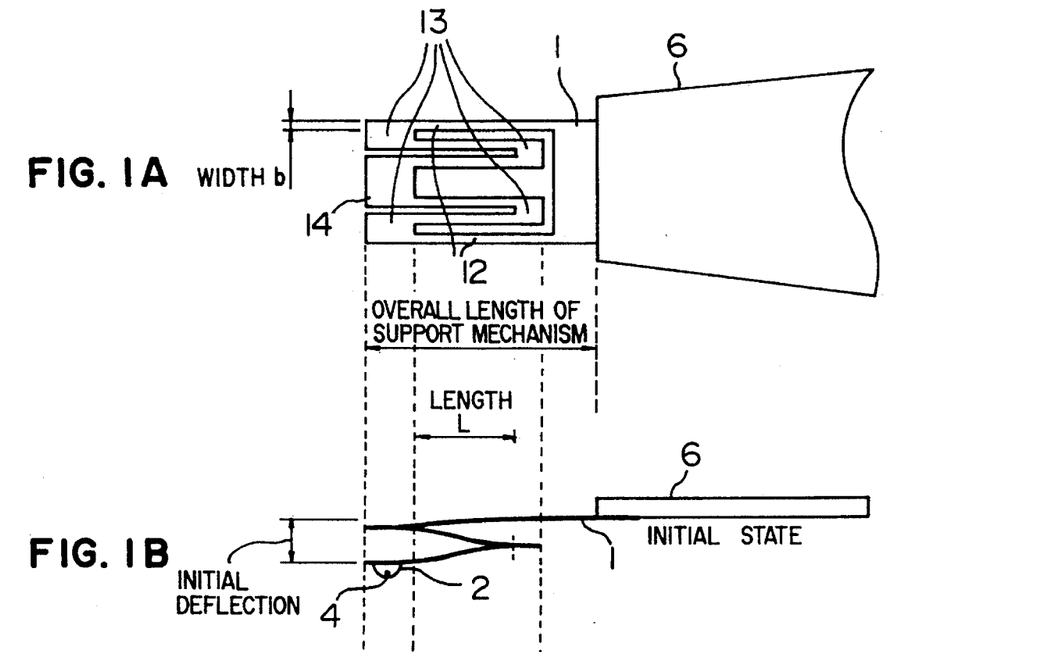
FIGS. 1A, 1B and 1C are a top plan view and side elevational views, respectively, showing an embodiment of a magnetic-head slider support mechanism according to the invention.
Figure 1C:
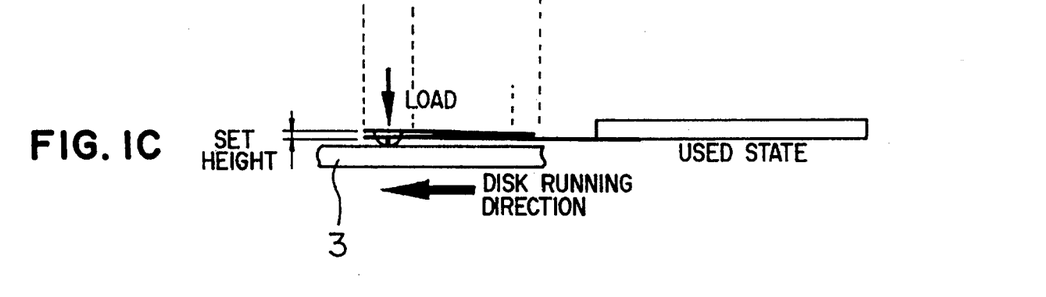

FIG. 1A is a top plan view of a first embodiment of the invention in which a curved-surface slider 2 having a limited or finite radius of curvature at least in the vicinity of a recording and reproducing element is loaded on a magnetic-head slider support mechanism 1 in which direction changing portions 13 are provided at two locations on each of flexible beams 12. FIGS. 1B and 1C are side elevational views of the embodiment.

The support mechanism 1 according to the present embodiment comprises two flexible beams 12 which are provided to extend from a joint with a guide arm 6 and which are finally connected to each other by a connection 14. The support mechanism 1 has the direction changing portions 13, at which the flexible beams 12 are oppositely directed in substantially the same but opposite direction to a direction, along which the flexible beams 12 extend in paths until being connected.

In the drawings, as the curved-surface slider 2, an example of a semi-spherical spherical slider is shown. However, the curved-surface slider 2 may be a ¼ partial spherical slider having a shape which is provided by dividing the spherical slider into two sections and cutting out a rearward half of the two sections from a contact portion to a magnetic disk 3, or a ship- or craft-slider in which a semi-sphere is so modified that radiuses of curvature vary depending upon a direction, or the like. The direction changing portions 13 may be more than one for each of the flexible beams. The support mechanism 1 is made of metallic material such as stainless steel and the like, a polymeric material such as polyimide and the like, Si and the like, and is molded by press molding, a thin-film processing technique which is used for semiconductors, etching processing, and the like. The support mechanism 1 is supported by the guide arm 6 which is high in rigidity.

In the drawings, an example is shown in which a corner of each of the direction changing portions is substantially rectangular. However, it is more preferable that the corner be rounded to have a radius of curvature equal to or more than 0.01 mm to that equal to or less than 5 mm. In case of stainless steel having a thickness of 10–30 μm, a length L of 2–8 mm, and a width b of 0.1–0.8 mm provide a spring constant which amounts to 0.01–0.5 mg/μm in the urging direction. Thus, design as occasion demands is possible. The magnetic head slider 2 is fixedly mounted on a center of a lower surface of the connection 14 of the support mechanism 1 by an adhesive and the like.

In an initial state, as shown in FIG. 1B, initial deflection is given downwardly. During use, as shown in FIG. 1C, the magnetic head slider 2 is urged against a surface of the magnetic disk 3. It is desirable that a set height during use is so designed as to be reduced. For example, in the case where a load is 50 mg, and a spring constant is 0.1 mg/μm, it is desirable that the initial deflection is substantially 500 μm, and the set height during use becomes substantially zero.

With the construction, since the overall length of the support mechanism 1 can be reduced to 3–9 mm, a natural frequency in a direction parallel to the disk surface is about 20 kHz, which is advantageous for high-speed seek operation. Further, since the length of the spring can be equal to or more than three times the shown length L, it is possible to reduce the spring constant in the urging direction. Even if a load is equal to or less than 100 mg, loading can be made stable. For this reason, it is possible to reduce a load acting upon the magnetic disk and, accordingly, a service life can be greatly improved.

Moreover, any rotary mechanism such as a pivot and the like is dispensed with, and there are provided the direction changing portions 13 and the torsional rigidity is at least equal to 100 gfmm/rad. Accordingly, the slider 2 is not substantially rotated relative to the guide arm in spite of the frictional force in the running direction or the radial direction of the disk and the upward and downward movement of the slider 2 due to surface fluctuation or assembling errors, so that a spacing loss is not generated. Thus, stable slider running of a flying type or contact type and recording and reproduction of high density are made possible.

In the case where the number of direction changing portions per a single beam is N, an effective length of the spring can be (N+1) times, at the maximum, the length L in the figures. Accordingly, the number of direction changing portions is changed whereby it is possible to produce any spring constants. Furthermore, here, description is made to the case where the magnetic-head slider support mechanism 1 is supported in a cantilever manner by the guide arm 6 and the flexible beams 12 are two in number. However, it is possible that a cut-out be provided in the guide arm 6, and the support mechanism 1 be arranged within the cut-out to support the support mechanism 1 at the both ends thereof. In that case, the arrangement may be such that two more flexible beams 12 may further be provided for connecting to the connection 14 also from the left in FIG. 1A, for example, so as to be symmetrical to the right and left. Alternatively, instead of such symmetrical structure, a single flexible beam may be connected to the connection 14 from the left in FIG. 1A.

The contour or shape of the slider 2 is not necessarily a spherical surface, but may have a suitable contour as described previously.

Figure 2A:
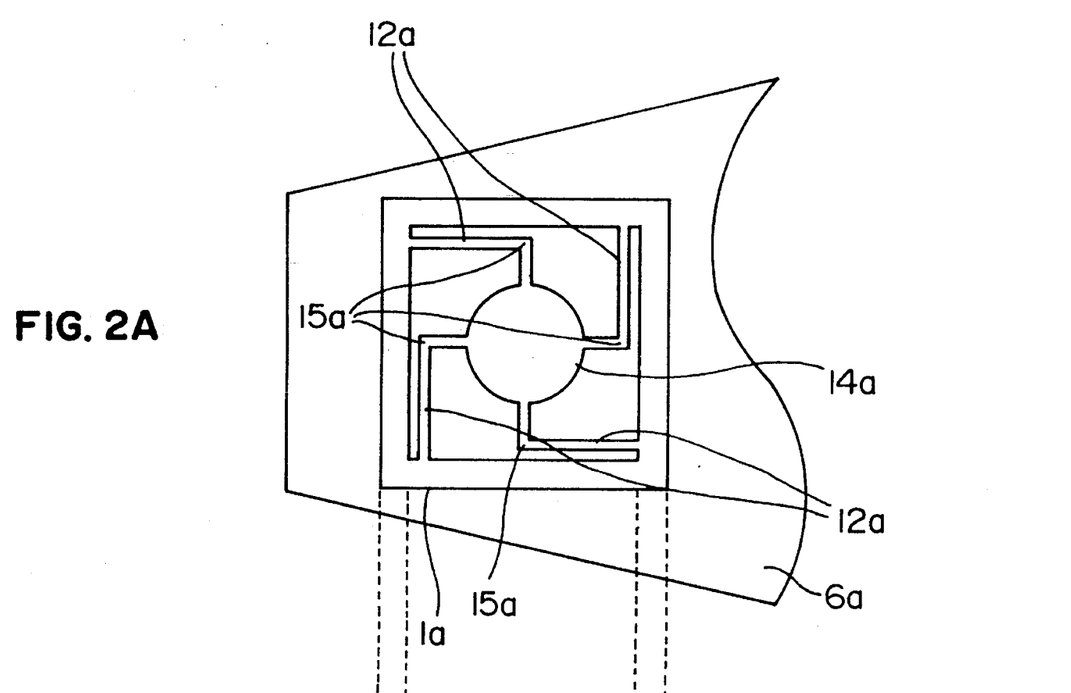
FIGS. 2A and 2B are a top plan view and a side elevational view, respectively, showing another embodiment of the magnetic-head slider support mechanism according to the invention.
Figure 2B:
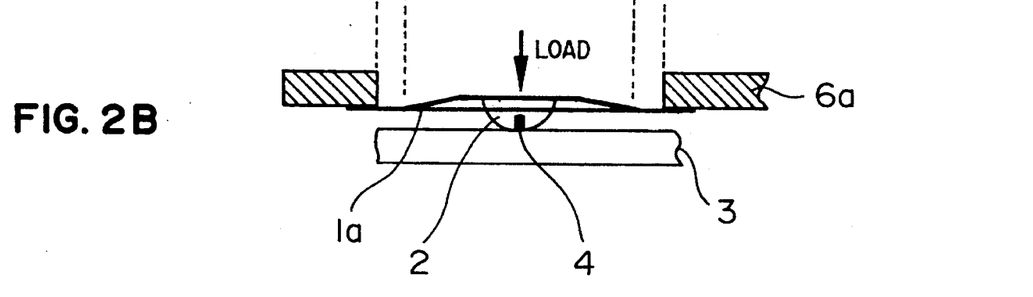

FIGS. 2A and 2B are a top plan view and a side elevational cross-sectional view, respectively, of a magnetic-head slider support mechanism of a leaf spring type according to a second embodiment of the invention, which comprises four flexible beams 12a extending respectively from their connections to a guide arm 6a so as to finally be connected to one another, and each flexible beam is provided with a bent portion 15a, at which the flexible beam is changed to a direction different from a direction which the flexible beam 12a follows respectively in paths to connections 14a. The four flexible beams 12a constitute a fylfot contour as a whole.

An arrangement shown in FIGS. 2A and 2B is an example in which a bending angle of each of the bending portions 15a is 90 degrees. However, the bending angle may not be 90 degrees. A support mechanism 1a is molded by press molding, etching processing and the like from a metallic material such as stainless steel having a thickness of 5–30 μm and the like, a polymeric material such as polyimide and the like, Si and the like. A spherical-surface slider 2 is fixedly mounted, by an adhesive and the like, on a center of a lower surface of the connection 14a of the support mechanism 1a.

Hitherto, in the case of a multi-point support structure such as a double-end support and the like, or an entire-periphery support structure such as a diaphragm and the like, a tension force acting upon the support mechanism upon deformation due to urging increases, so that it is difficult to realize the spring constant of 0.01 to 0.5 mg/μm. The present embodiment has a feature in that the tension force upon urging can be converted into a bending or torsional deformation as shown by arrows in FIG. 2A, whereby the spring constant can be realized even by the multi-point support structure. For example, if stainless steel whose thickness is 10 µm is used, one edge or side of the support mechanism is 5 mm and the width of each flexible beam is 0.1 mm, the spring constant will be 0.1 mg/µm, so that a load of 50 mg can stably be loaded.

Figure 3:
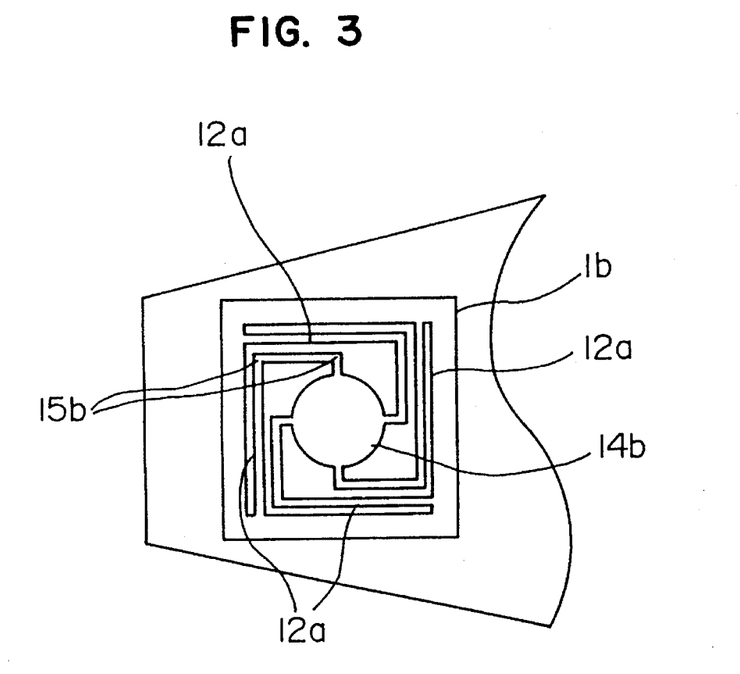
FIG. 3 is a top plan view showing another embodiment of the magnetic-head slider support mechanism according to the invention.

FIG. 3 shows a third embodiment of the invention in which a further bent portion 15b is added to each of four flexible beams 12a each having the shape shown in FIG. 2, so that bent portions provided for each flexible beam is two in total. A spherical-surface slider 2 is fixedly mounted on a center of a lower surface of a connection 14b of a support mechanism 1b by an adhesive and the like. In this manner, the number of bent portions 15b is increased to enable making miniaturization of the overall dimension and a demand for high natural frequency compatible with each other owing to a small spring constant.

Figure 4:
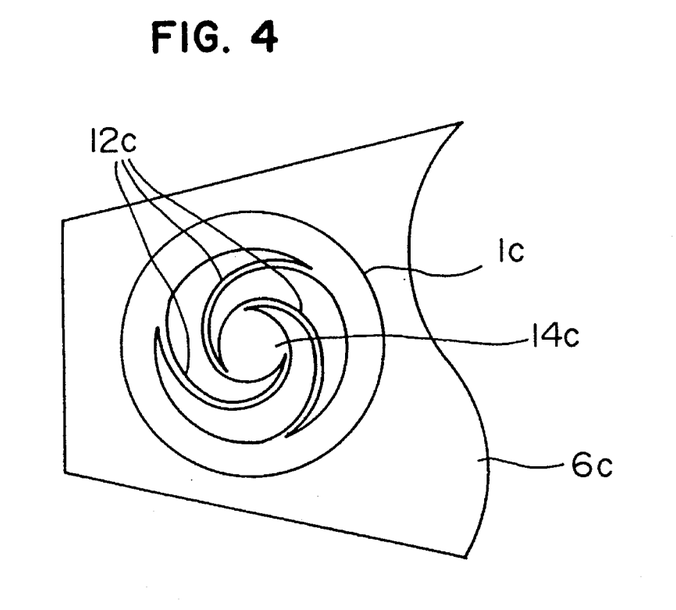
FIG. 4 is a top plan view showing another embodiment of the magnetic-head slider support mechanism according to the invention.

FIG. 4 is a top plan view of a magnetic-head slider support mechanism 1c of a leaf spring type according to a fourth embodiment of the invention, which comprises three flexible beams 12c extending respectively from their connections to a guide arm 6c and finally connected to the guide arm 6c, and in which each flexible beam 12c changes direction with a continuously changing curvature in paths to a connection 14c to be made helical-shaped as a whole. A sphericalsurface slider 2 is fixedly mounted on a center of a lower surface of the connection 14c of the support mechanism 1c by an adhesive and the like. A material and a processing method are similar to those shown in FIGS. 2A, 2B and 3. Also in the case of the present embodiment, the use of an etching technique of Si used in a semiconductor makes workability favorable and effective. Employment of such shape or configuration increases the degree of freedom in design with respect to the number, a rigidity and the like of the flexible beams. Thus, there is an advantage that it is possible to easily design the requisite spring constant and torsional rigidity.

Figure 5:
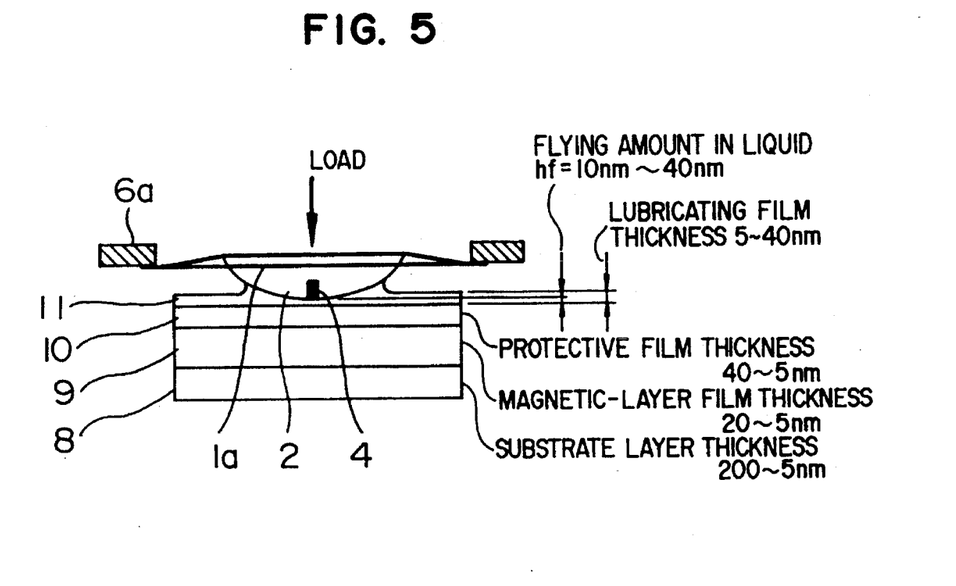
FIG. 5 is a side elevational cross-sectional view illustrating a liquid flying running system that is an embodiment of the invention.

FIG. 5 shows an example in which the magnetic-head slider support mechanism 1a and the spherical-surface slider 2 according to the second embodiment of the invention shown in FIGS. 2A and 2B are used to provide a running system of a slider due to liquid lubrication flying.

The recording and reproducing element 4 is disposed in a position closest to the magnetic disk surface of the sphericalsurface slider 2. The magnetic disk is constructed to have a substrate layer 8 having a thickness of 5 to 200 nm such as Nb, Cr, CrTi and the like on a substrate such as carbon, Ti, SiC, tempered glass, Al alloy with NiP plating, ceramics, polyimide, PET film and the like, a magnetic layer 9 on the substrate layer 8 having a thickness of 5 to 20 nm such as CoCrTa, CoCrPt, CoNiCr and the like, a protective film 10 having a thickness of 5 to 40 nm and consisting of C, (MOW) C, carbon containing hydrogen, $ZrO_2$, (ZrNb)N and the like, and a liquid lubricant 11 having a thickness of 5 to 40 nm such as perfluro alkyl polyether having a terminal group or end group of adsorption, polarity or reactivity., wherein the respective layers are laminated in layers.

According to the present embodiment, since it is possible to load a stable load even equal to or less than 100 mg, flying in liquid can be effected stably on the magnetic disk with a flying amount of 10–40 nm.

In connection with the above, with the use of the magnetic-head slider support mechanism shown in FIG. 1A, FIG. 3 or FIG. 4, flying in liquid can be effected stably.

Figure 6:
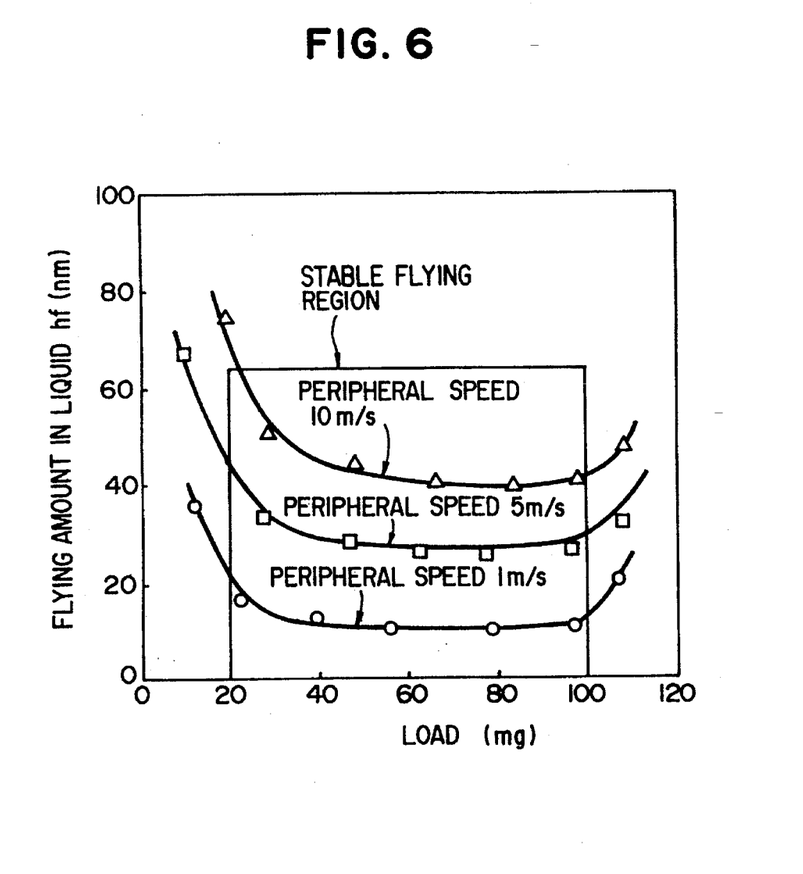
FIG. 6 is a view of a relationship between a liquid flying amount and a load.

FIG. 6 is a graph showing the results of measurement of a flying amount in the liquid lubrication flying system shown in FIG. 5, when a load on the magnetic head slider 2 against the disk surface is changed.

In the case where the load is less than 20 mg, the flying amount becomes unstable under the influence of air flow induced by rotation of the disk and the like. Furthermore, in the case where a load is larger than 100 mg, load capacity of liquid is exceeded, so that solid contact with the protective film layer occurs to make flying unstable.

In FIG. 5, even in a system in which the liquid lubricant 11 is not used, and the magnetic head slider 2 runs between it and the protective film 10 under a solid contact state, the magnetic-head slider support mechanism according to the invention is indispensable for stable running. In the case where a load is larger than 100 mg, the contact force increases so that the stability of the slider becomes worse. Accordingly, it is necessary in the slider running system of a liquid flying type or a solid contact type to set a load to a range of from 20–100 mg. If the running system is used within the range, flying stability or running stability is extremely superior.

According to the invention, it is possible to stably apply a load equal to or less than 100 mg on the magnetic head slider. Further, the magnetic head slider is not substantially rotated with respect to the magnetic disk surface. Accordingly, the slider running system of a liquid flying type or a solid contact type having a flying amount of 10 to 40 nm is made possible. Thus, it is possible to provide the magnetic disk apparatus of high-density recording which is high in reliability.

What is claimed is:

1. A magnetic-head slider support mechanism for supporting a magnetic head slider connected to a guide arm and mounting thereon an information recording and reproducing element, and including a leaf spring for generating a load on a magnetic disk, the improvement wherein said leaf spring connects said guide arm and a magnetic head slider mounting portion to each other in a non-linear manner, and said magnetic head slider is supported by a plurality of flexible beams of said leaf spring each having an initial deflection in an unloaded state of the magnetic disk in a direction which is substantially normal to and directed toward a surface of the magnetic disk to substantially minimize rotational movement of the magnetic head slider at least in a rolling direction and a pitching direction by decreasing a spacing between the magnetic head slider mounting portion of said leaf spring and other portions of said leaf spring in a loaded state, wherein respective ones of said plurality of flexible beams are arranged substantially in parallel to be adjacent to each other, and direction changing portions are connected to the adjacent flexible beams at alternative ends thereof to form zig-zag configurations which are symmetrical to each other as a whole.

2. A magnetic-head slider support mechanism for supporting a magnetic head slider connected to a guide arm and mounting thereon an information recording and reproducing element, and including a leaf spring for generating a load on a magnetic disk, the improvement wherein said leaf spring connects said guide arm and a magnetic head slider mounting portion to each other in a non-linear manner, and said magnetic head slider is supported by a plurality of flexible beams of said leaf spring each having an initial deflection in an unloaded state of the magnetic disk in a direction which is substantially normal to and directed toward a surface of the magnetic disk to substantially minimize rotational movement of the magnetic head slider at least in a rolling direction and a pitching direction by decreasing a spacing between the magnetic head slider mounting portion of said leaf spring and other portions of said leaf spring in a loaded state, wherein said leaf spring extends from said guide arm, and comprises at least two flexible beams connected to said magnetic head slider mounting portion, and wherein each of said flexible beams is provided with at least one substantially U-shaped direction changing portion which changes direction to a direction opposite to a direction which said each flexible beam follows.

3. A magnetic-head slider support mechanism for supporting a magnetic head slider connected to a guide arm and mounting thereon an information recording and reproducing element, and including a leaf spring for generating a load on a magnetic disk, the improvement wherein said leaf spring connects said guide arm and a magnetic head slider mounting portion to each other in a non-linear manner, and said magnetic head slider is supported by a plurality of flexible beams of said leaf spring each having an initial deflection in an unloaded state of the magnetic disk in a direction which is substantially normal to and directed toward a surface of the magnetic disk to substantially minimize rotational movement of the magnetic head slider at least in a rolling direction and a pitching direction by decreasing a spacing between the magnetic head slider mounting portion of said leaf spring and other portions of said leaf spring in a loaded state, wherein said flexible beams are joined to said guide arm to form a closed region, substantially at a center of which the magnetic head slider mounting portion is located, and wherein said plurality of flexible beams are provided in point symmetry with respect to said magnetic head slider mounting portion.

4. A magnetic-head slider support mechanism according to claim 3, wherein said leaf spring comprises two or more flexible beams extending from said guide arm and connected to said magnetic head slider mounting portion, and wherein each of said flexible beams is provided with at least one bent portion which changes direction to a direction different from a direction which said each flexible beam follows.

5. A magnetic-head slider support mechanism according to claim 3, wherein said leaf spring comprises two or more flexible beams extending from said guide arm and connected to said magnetic head slider mounting portion, and wherein each of said flexible beams is configured such that it changes direction with a curvature or in a helical manner in a path leading to a connection of the flexible beams.

6. A magnetic-head slider support mechanism according to one of claims 2–4, wherein a torsional rigidity of the leaf spring acting during rotary motion in the rolling and pitching directions of said magnetic head slider to said guide arm is at least equal to 100 gfmm/rad.

7. A magnetic-head slider support mechanism according to claim 6, wherein a spring constant in a direction, in which said magnetic head slider is urged against the magnetic disk surface, is at least equal to 0.01 mg/μm and no greater than 0.5 mg/μm.

8. A magnetic-head slider support mechanism according to claim 7, wherein said magnetic head slider mechanism is formed by integral molding with said guide arm.

9. A magnetic recording apparatus including a magnetic-head slider support mechanism according to claim 7, and wherein said magnetic head slider runs under a fluid flying or contact condition on the magnetic disk to effect recording and reproducing operation.

10. A magnetic recording apparatus according to claim 9, wherein a load, at which said magnetic-head slider support mechanism urges said magnetic head slider against a magnetic disk surface, is not less than 20 mg and not more than 100 mg.

11. A magnetic recording apparatus according to claim 9, wherein said magnetic disk has at least a protective film layer or a liquid lubricant layer, and said magnetic head slider records and reproduces information while being in contact with said protective film or said liquid lubricant.

12. A magnetic-head slider support mechanism comprising means for supporting a magnetic head slider and being connected to a guide arm, the magnetic head slider mounting thereon an information recording and reproducing element, the supporting means including a leaf spring for generating a load on a magnetic disk, the leaf spring connecting the guide arm and a magnetic head slider mounting portion to each other in a non-linear manner, the supporting means supporting the magnetic head slider by a plurality of flexible beams of the leaf spring, a portion of the leaf spring at which the magnetic head slider mounting portion is mounted has an initial deflection in a direction which is substantially normal to a surface of the magnetic disk when the magnetic head slider is not loaded on the magnetic disk, the portion of the leaf spring at which the magnetic head slider mounting portion is mounted and having the initial deflection being closer to the magnetic disk than other portions of the leaf spring, the support means substantially preventing rotatable movement of the magnetic head slider at least in directions other than in a direction substantially normal to the surface of the magnetic disk by decreasing a spacing between the magnetic head slider mounting portion of said leaf spring and other portions of said leaf spring in a loaded state.

13. A magnetic-head slider support mechanism according to claim 12, wherein the leaf spring of the support means has a spring constant of 0.01 to 0.5 mg/μm in a direction normal to a surface of the leaf spring and a torsional rigidity at least equal to 100 gfmm/rad so as to substantially prevent rotational movement of the magnetic head slider at least in a rolling direction and a pitching direction.

14. A magnetic-head slider support mechanism according to claim 12, wherein the flexible beams of the leaf spring have a fylfot contour.

* * * * *